Feb. 5, 1952     E. A. BUCKMAN ET AL     2,584,422
MULTIPLE RATE VALVE
Filed Jan. 8, 1948     2 SHEETS—SHEET 1
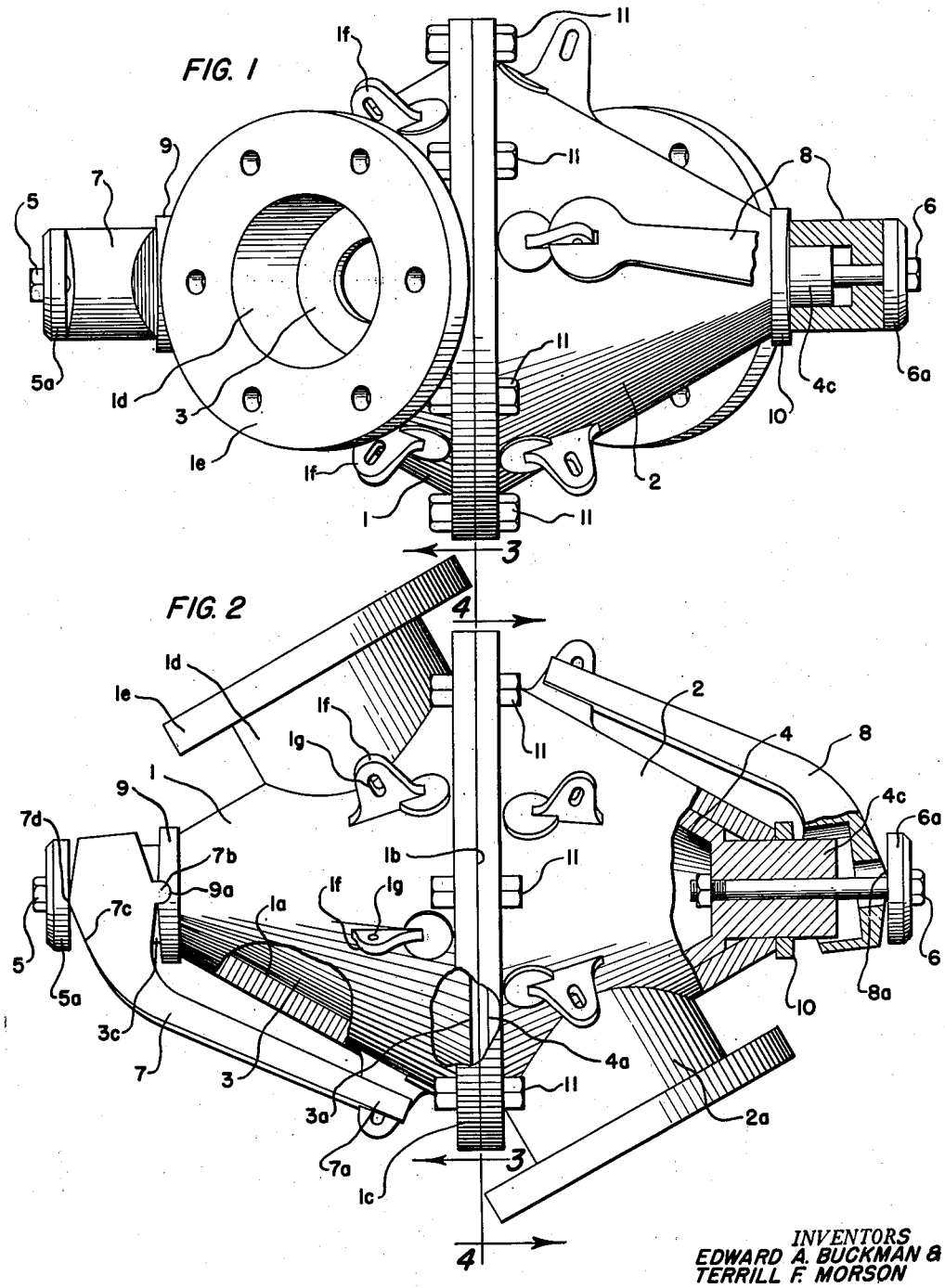
INVENTORS
EDWARD A. BUCKMAN &
TERRILL F. MORSON
BY
*Wm. H. Dean*
AGENT INVENTORS
EDWARD A. BUCKMAN &
TERRILL F. MORSON
BY
Wm. H. Dean
AGENT Patented Feb. 5, 1952

2,584,422

UNITED STATES PATENT OFFICE 2,584,422

MULTIPLE RATE VALVE

Edward A. Buckman, Los Angeles, and Terrill F. Morson, San Diego, Calif.; said Buckman assignor to said Morson Application January 8, 1948, Serial No. 1,214

7 Claims. (Cl. 277—69)

Our invention relates to a valve, more particularly to a high pressure metering valve, and the objects of our invention are:

First, to provide a valve of this class which may be used as a reducing valve and which provides for the metering of fluid from a large conductor in small quantities or large quantities as desired;

Second, to provide a valve of this class providing a variety of angular transitions as desired;

Third, to provide a valve of this class having conical valve sleeves which cooperate with cam arms for holding the conical sleeves in snug position internally of the conical casings whereby leakage of fluid is positively prevented;

Fourth, to provide a valve of this class having inlet cones therein provided with a variety of orifices which may be readily revolved and quickly changed and indexed with the opening in the casing surrounding the same for varying the flow of the fluid through the valve;

Fifth, to provide a valve of this class in which the fluid may be shut off and which maintains the fluid shut-off while the internal structure of the valve may be removed and repaired;

Sixth, to provide a valve of this class having novel means for adjusting the cone bearing pressure exerted by the cam arms which are employed to move and lock the same;

Seventh, to provide a valve of this class which is very compact in accordance with its function; and Eighth, to provide a valve of this class which is very simple and economical of construction, efficient in operation and which will not readily deteriorate or get out of order.

Figure 3:
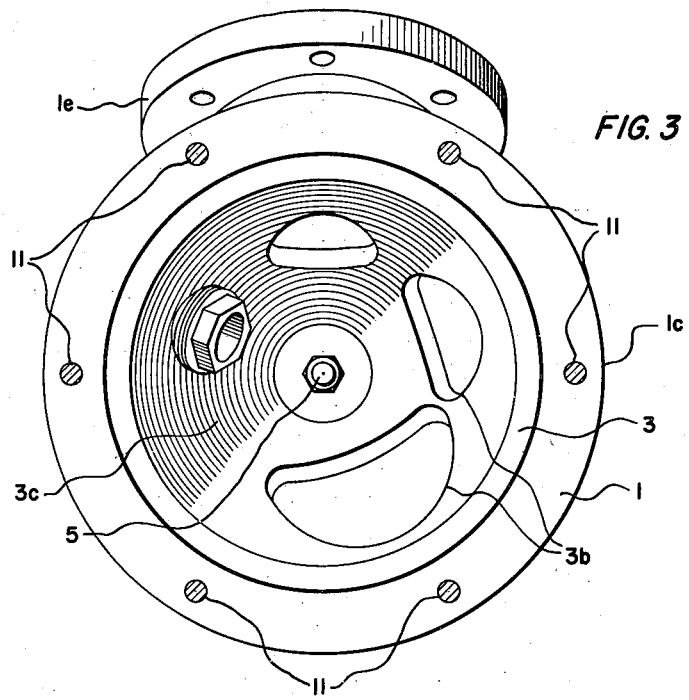
Figure 4:
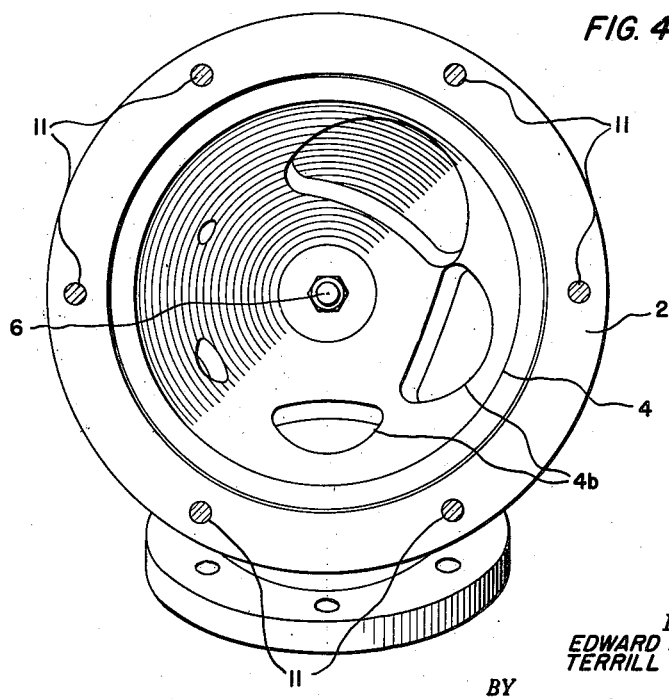

With these and other objects in view, as will appear hereinafter, our invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is an elevational view of the inlet end of our valve showing portions thereof broken away and in section to amplify the illustration; Fig. 2 is a side elevational view of our valve shown taken substantially 90° to the plane of Fig. 1 and showing portions broken away and in section to amplify the illustration; Fig. 3 is a sectional view taken from the line 3—3 of Fig. 2 and Fig. 4 is a sectional view taken from the line 4—4 of Fig. 2.

Similar characters of reference refer to similar parts and portions throughout the several views of the drawings.

The inlet casing 1, outlet casing 2, inlet cone 3, outlet cone 4, bolts 5 and 6, cam arms 7 and 8, cam bearings 9 and 10 and the clamp bolts 11 constitute the principal parts and portions of our valve.

The inlet and outlet casings 1 and 2 are substantially identical in form. Each of these casings may be interchanged and each casing is dimensionally identical within normal tolerances. Inasmuch as both inlet and outlet casings 1 and 2 are similar, the inlet casing 1 will be described in detail. This inlet casing 1 is a frusto-conical casing and is provided with a conical bore portion 1a therein in which the inlet cone 3 is revolubly and reciprocally mounted. The base end 1b of the casing 1 is provided with a flange 1c through which the bolts 11 extend for connecting the casing 1 to the casing 2 which is provided with a flange similar to the flange 1c as shown in Figs. 1 and 2 of the drawings. It will be noted that the skirt edge 3a of the inlet cone 3 is slightly spaced from the plane of the joinder of the two casings 1 and 2. In a corresponding relationship, the outlet cone 4 at its skirt edge 4a is spaced from the joinder of the casings 1 and 2 to permit longitudinal axial movement of the cones 3 and 4 in the casings 1 and 2 for relief thereof preliminary to rotation of said cones in the casings 1 and 2. Integral with the body of the casing 1 is an inlet conductor portion 1d having a flange portion 1e surrounding the same for connection with a conventional pipe, all as shown best in Figs. 1 and 2 of the drawings. Integral with the outer side of the casing 1 are lugs 1f provided with openings 1g therein which lugs 1f are arranged to be straddled by the bifurcated portions 7a of the cam arm 7. The openings 1g are arranged to receive the loop of a conventional padlock or the like, in order to prevent movement of the cam arm 7 after it has been set for indexing the inlet cone 3 with the inlet conductor portion 1d of the casing 1.

The inlet and outlet cones 3 and 4 respectively, as shown in Figs. 3 and 4 are provided with a plurality of various sized openings 3b and 4b respectively, which are arranged to index with the inlet 1d of the casing 1 and the outlet 2a of the casing 2. It will be noted that the outlet sleeve 4 is provided with four openings varying in size while the inlet sleeve 3 is provided with only three openings leaving a closed space 3c of sufficient area to entirely cover the inlet conductor portion 1d of the inlet casing 1 whereby said enclosed space 3c is arranged to shut-off the inlet flow of fluid into our valve when positioned over the inlet conductor portion 1d. It will be noted that the openings 3b and 4b of the valve cones 3 and 4 vary from the full capacity of the inlet and outlet conductor portions 1d and 2a of the inlet casings 1 and 2 to a small fraction of said capacity. These inlet and outlet cones 3 and 4 respectively are provided with hub portions 3c and 4c in which the bolts 5 and 6 respectively are connected as shown best in Fig. 2 of the drawings. These bolts are longitudinally adjustable relatively to the valve cones 5 and 6 and are provided with washers 5a and 6a respectively adjacent the outer heads thereof which bear against the cam arms 7 and 8 respectively. These cam arms 7 and 8 are provided with cam bearing portions 7d and 8a which engage the washers 5a and 6a respectively for forcefully moving the valve cones 3 and 4 outwardly in the casings 1 and 2 respectively. The cam bearings 9 and 10 are abutted against the ends of the casings 1 and 2 adjacent the openings therein through which the hub portions 3c and 4c of the valve cones 3 and 4 project. These cam bearings 9 and 10 surround the portions 3c and 4c of the valve cones 3 and 4 respectively, and the cam bearing 9 which is identical with the cam bearing 10 as shown in Fig. 2 of the drawings is provided with opposed arcuate recess portions 9a arranged to engage the nibs 7b of the cam arm 7 at opposite sides of the portion 3c of the valve cone 3.

The operation of our valve is substantially as follows:

Inasmuch as the valve cone 3 operates in an identical manner to the valve cone 4, detailed description of the operation of the valve cone 3 will be made herein. To rotate the valve cone 3 in the casing 1 the cam arm 7 at its bifurcated end portion 7a is moved away from the casing 1 until the cam bearing portion 7d passes the center of the bolt 5 and the flat portion 7c engages the washer 5a. The cam arm 7 pivots about the axis of the nib 7b and this permits relaxation of the conical surface of the valve cone 3 in the casing 1 at the internal conical bore 1a thereof. The cam arm 7 may be rotated about the axis of the valve cone 3 to index the bifurcated portion 7a of the cam arm 7 with any one of the lugs 1f at which time one of the openings 3b will index with the inlet conductor 1d. If it is desired to shut off the flow of the fluid into the valve the enclosed space 3c of the valve cone 3 may be indexed with the inlet conductor 1d. When the cam arm 7 is in the desired radial position, the bifurcated portion 7a may be placed over one of the lugs 1f and the loop of a padlock may be inserted through the opening 1g therein for locking the cam arm 7 in a certain position. It will be noted that each time the cam arm 7 is pivoted downwardly to engage the bifurcated portion with one of the lugs 1g that the cam bearing portion 7d forcefully engages the washer 5a and forces the valve cone 3 outwardly in intimate contact with the internal conical wall 1a of the casing 1. It will be here noted, however, that water pressure or fluid pressure inside the valve tends to seal the same by forcing the conical valve cones 3 and 4 outwardly against the internal walls of the casings 1 and 2 respectively. Longitudinal movement of the valve cones 3 and 4 in the casings 1 and 2 is permitted by the spaced relationship of the skirt portions 3a and 4a of the valve cones 3 and 4, all as shown best in Fig. 2.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a valve of the class described, the combination of a pair of opposed frusto-conical casings having converging bore portions, conical valve members each having a plurality of different sized inlet and outlet openings and revolubly mounted in said casings and having portions projecting from the small diameter end portions of said frusto-conical casings, each of said casings having an opening in the side wall thereof communicating with the outer side of one of said valve cones, cam arms having cam portions engageable with the small diameter ends of said casings and pivotally connected with the projecting portions of said valve cones for rotatably operating the same, said cam arms pivoted transversely of the axis of said conical valve members, whereby said cam portions force said conical valve members into the converging bore portions of said casings when pivoted on said axis transversely of said valve members.

2. In a valve of the class described, the combination of a pair of opposed frusto-conical casings having converging bore portions, conical valve members revolubly mounted in said casings and having portions projecting from the small diameter end portions of said frusto-conical casings, each of said casings having an opening in the side wall thereof communicating with the outer side of one of said valve cones, cam arms having cam portions engageable with the small diameter ends of said casings and pivotally connected with the projecting portions of said valve cones for rotatably operating the same, said cam arms pivoted transversely of the axis of said conical valve members, whereby said cam portions force said conical valve members into the converging bore portions of said casings when pivoted on said axis transversely of said valve members, each of said valve cones having a plurality of openings therein, one of said valve cones having an enclosed space therein arranged to cover the respective opening in one of said casings for shutting off flow of fluid through said valve.

3. In a valve of the class described, the combination of a pair of opposed frusto-conical casings, conical valve members revolubly mounted in said casings and having portions projecting from the small diameter end portions of said frusto-conical casings, each of said casings having an opening in the side wall thereof communicating with the outer side of one of said valve cones, cam arms pivotally connected with the projecting portions of said valve cones for rotatably operating the same, each of said valve cones having a plurality of openings therein, one of said valve cones having an enclosed space therein arranged to cover the respective opening in one of said casings for shutting off flow of fluid through said valve, said cam arms having cam portions thereon, a bolt connecting with each of said cones with a respective cam arm whereby pivotal movement thereof on an axis transversely of the axis of said valve cones tightens the respective valve cone in the respective casing.

4. In a valve of the class described, the combination of a pair of opposed frusto-conical casings, conical valve members revolubly mounted in said casings and having portions projecting from the small diameter end portions of said frusto-conical casings, each of said casings having an opening in the side wall thereof communicating with the outer side of one of said valve cones, cam arms pivotally connected with the projecting portions of said valve cones for rotatably operating the same, each of said valve cones having a plurality of openings therein, one of said valve cones having an enclosed space therein arranged to cover the respective opening in one of said casings for shutting off flow of fluid through said valve, said cam arms having cam portions thereon, a bolt connecting with each of said cones with a respective cam arm whereby pivotal movement thereof on an axis transversely of the axis of said valve cones tightens the respective valve cone in the respective casing, the extending ends of said cam arms being bifurcated and lug portions on the outer sides of said casing arranged to project through said bifurcated portion of said cam arms.

5. In a valve of the class described, the combination of a pair of opposed frusto-conical casings, conical valve members revolubly mounted in said casings and having portions projecting from the small diameter end portions of said frusto-conical casings, each of said casings having an opening in the side wall thereof communicating with the outer side of one of said valve cones, cam arms pivotally connected with the projecting portions of said valve cones for rotatably operating the same, each of said valve cones having a plurality of openings therein, one of said valve cones having an enclosed space therein arranged to cover the respective opening in one of said casings for shutting off flow of fluid through said valve, said cam arms having cam portions thereon, an adjusting bolt in connecting each of said cones with a respective cam arm whereby pivotal movement thereof on an axis transversely of the axis of said valve cones tightens the respective valve cone in the respective casing, the extending ends of said cam arms being bifurcated and lug portions on the outer sides of said casing arranged to project through said bifurcated portion of said cam arms, openings in said lugs for receiving a locking means for holding said cam arms in closed position.

6. In a valve of the class described, the combination of a pair of opposed frusto-conical casings having converging bore portions, conical valve members revolubly mounted in said casings and having portions projecting from the small diameter end portions of said frusto-conical casings, each of said casings having an opening in the side wall thereof communicating with the outer side of one of said valve cones, cam arms having cam portions engageable with the small diameter ends of said casings and pivotally connected with the projecting portions of said valve cones for rotatably operating the same, said cam arms pivoted transversely of the axis of said conical valve members, whereby said cam portions force said conical valve members into the converging bore portions of said casings when pivoted on said axis transversely of said valve members, each of said valve cones having a plurality of openings therein, one of said valve cones having an enclosed space therein arranged to cover the respective opening in one of said casings for shutting off flow of fluid through said valve, cam bearings abutted to the ends of said casings surrounding said projecting portions of said valve cones providing a bearing surface for said cam arms.

7. In a valve of the class described, the combination of a pair of opposed frusto-conical casings having converging bore portions, conical valve members each having a plurality of different sized inlet and outlet openings and revolubly mounted in said casings and having portions projecting from the small diameter end portions of said frusto-conical casings, each of said casings having an opening in the side wall thereof communicating with the outer side of one of said valve cones, cam arms having cam portions engageable with the small diameter ends of said casings and pivotally connected with the projecting portions of said valve cones for rotatably operating the same, said cam arms pivoted transversely of the axis of said conical valve members, whereby said cam portions force said conical valve members into the converging bore portions of said casings when pivoted on said axis transversely of said valve members, the openings in the side walls of said casings projecting axially at angular relationship to the connection plane of said casings.

EDWARD A. BUCKMAN.
TERRILL F. MORSON.

REFERENCES CITED

The following references are of record in the file of this patent:

UNITED STATES PATENTS

| Number | Name | Date |
| --- | --- | --- |
| 219,441 | Mather | Sept. 9, 1879 |
| 1,043,018 | Long | Oct. 29, 1912 |
| 1,128,846 | Carroll | Feb. 16, 1915 |
| 1,151,697 | Libero | Aug. 31, 1915 |
| 1,267,489 | Wray | May 28, 1918 |
| 1,496,584 | McCrink | June 3, 1924 |
| 1,566,605 | Jamison | Dec. 22, 1925 |
| 1,835,379 | Croslen | Dec. 8, 1931 |
| 1,843,930 | Patterson | Feb. 9, 1932 |